(12) United States Patent
Montalbano

(10) Patent No.: US 7,941,099 B2
(45) Date of Patent: May 10, 2011

(54) SIR ESTIMATION TECHNIQUES

(75) Inventor: Giuseppe Montalbano, Villeneuve Loubet (FR)

(73) Assignee: NXP B.V., Eindhoven (NL)

( * ) Notice: Subject to any disclaimer, the term of this patent is extended or adjusted under 35 U.S.C. 154(b) by 677 days.

(21) Appl. No.: 11/632,886

(22) PCT Filed: Jul. 11, 2005

(86) PCT No.: PCT/IB2005/052285
§ 371 (c)(1),
(2), (4) Date: May 2, 2008

(87) PCT Pub. No.: WO2006/011078
PCT Pub. Date: Feb. 2, 2006

(65) Prior Publication Data
US 2008/0318530 A1 Dec. 25, 2008

(30) Foreign Application Priority Data
Jul. 19, 2004 (EP) .................................. 04300448

(51) Int. Cl.
*H04B 1/00* (2006.01)
(52) U.S. Cl. .................. 455/63.1; 375/147; 375/224
(58) Field of Classification Search ............ 455/63.1
See application file for complete search history.

(56) References Cited

U.S. PATENT DOCUMENTS

| | | | |
|---|---|---|---|
| 7,336,701 B2* | 2/2008 | Kearney et al. | 375/224 |
| 2002/0122470 A1* | 9/2002 | Heikkila | 375/147 |
| 2003/0016740 A1 | 1/2003 | Jesek et al. | |
| 2003/0096618 A1 | 5/2003 | Palenius | |
| 2007/0258547 A1 | 11/2007 | Montalbano | |

FOREIGN PATENT DOCUMENTS

| | | |
|---|---|---|
| CN | 1471338 A | 1/2004 |
| EP | 1 280 282 A2 | 1/2003 |
| WO | 02/23840 A1 | 3/2002 |
| WO | 03/028323 A1 | 4/2003 |
| WO | 03/039058 A2 | 5/2003 |
| WO | 03/049337 A1 | 6/2003 |

OTHER PUBLICATIONS

Sampath, A. et al. "Analysis of Signal-to-Interference Ratio Estimation Methods for Wireless Communication Systems", 2001 IEEE Int'l. Conf. on Communications, vol. 1 of 10, pp. 2499-2503 (Jun. 2001).
Jeske, D. et al. "Signal-to-Interference Ratio Estimation Based on Decision Feedback", IEEE Vehicular Technology Conf. (#53), vol. 4 of 4, pp. 2484-2488 (May 2001).
Rejection Decision in Chinese patent appln. No. 200580031505.3, with English translation (Apr. 21, 2010).

* cited by examiner

*Primary Examiner* — Duc Nguyen
*Assistant Examiner* — Ajibola Akinyemi

(57) ABSTRACT

The estimated power levels that are used to estimate a signal-to-interference ratio (SIR) are filtered so as to minimize the mean-square error (MSE) of the estimated power estimates. First order infinite impulse response (IIR) filters are used to filter both the signal power estimates and the noise power estimates. Optionally, estimates of the average signal power and average interference power are filtered using Weiner linear prediction filters. The SIR estimates are suitable for use in a transmission channel that includes fading as well as interference, and are suitable for use in BPSK, QPSK, and other modulation systems.

20 Claims, 1 Drawing Sheet

SIR ESTIMATION TECHNIQUES

This invention relates to the field of communication systems, and in particular to a communications device that determines an improved signal-to-interference ratio (SIR) measure.

Wireless communication systems are often configured to provide efficient communications using minimal transmission power among the transmitters. Reduced transmission power provides for reduced power consumption, and thereby increased battery life. Reduced transmission power also provides for reduced levels of interference among transmitters. Optimally, each transmitter in a wireless communication system would be configured to transmit at a minimized power level that provides for reliable communication at the receiver. This minimum transmission power level is a function of the losses in the path between the transmitter and the receiver, as well as the amount of interference from other sources that is added to the received signal.

A common technique for optimizing transmission power in a communications system is a feedback loop, wherein the receiver notifies the transmitter of its ability to reliably receive each transmission, and the transmitter adjusts its transmit power accordingly. If the receiver reports that the received signal is not at a sufficient level to effect reliable decoding of the transmitted signal, the transmitter increases its transmit power; if the receiver reports more than a sufficient level to effect reliable decoding, the transmitter decreases its transmit power, until the receiver reports an insufficient level, at which point the transmit power is increased. Eventually, the transmitter power is adjusted to the transition point between sufficient and insufficient power, thereby providing the minimum transmit power required to communicate reliably.

For a receiver-transmitter power-control feedback technique to work properly, the receiving system must provide an accurate assessment of the sufficiency of the received signal strength. A common measure of a receiver's ability to effectively decode a transmitted-signal is the ratio of the received transmitted-signal strength (S) to the total received interference/noise strength (I), this ratio being commonly termed a signal-to-interference ratio (SIR). Typically, the SIR can be estimated by a variety of techniques, depending, for example, on whether the transmitter is transmitting a known signal (e.g. pilot symbols), or unknown signals (e.g. data symbols), and/or on the techniques used to distinguish the transmitted signal from the interference.

Ashwin Sampath and Daniel R. Jeske have disclosed techniques for estimating the signal-to-interference ratio in "*Analysis of Signal-to-Interference Ratio Estimation Methods for Wireless Communication Systems*" (Proceedings of IEEE ICC, 2001), and "*Signal-to-Interference Ratio Estimation Based on Decision Feedback*" (Proceedings of IEEE VTC, Spring 2001). The disclosed techniques, however, assume a BPSK modulation scheme, and an additive white Gaussian noise (AWGN) model for the transmission channel. Sampath and Jeske disclose filtering techniques for estimates of the interference term, and note that the estimate of the signal power is not amenable to long-term smoothing techniques.

It is an object of this invention to provide a method and system for accurately estimating the signal to interference ratio (SIR) of a received signal. It is a further object of this invention to provide a method and system for estimating an SIR based on filtered signal and interference estimates.

These objects and others are achieved using a variety of techniques. Of particular note, the noise/interference estimates are filtered so as to minimize the mean-square error (MSE) of the estimated noise/interference power estimates. First order infinite impulse response (IIR) filters are used to filter both the signal power estimates and the noise power estimates. Optionally, estimates of the average signal power and average interference power are filtered using Weiner linear prediction filters. The SIR estimates are based on a channel noise model that includes fading as well as interference, and are suitable for use in BPSK, QPSK, and other modulation systems.

Throughout the drawings, the same reference numeral refers to the same element, or an element that performs substantially the same function.

For ease of understanding, this invention is hereinafter presented using the paradigm of a UMTS-compatible transceiver 100. As is known in the art, the UMTS standard is a commonly-used standard for wireless communications, the details of which are provided, for example, in the "3GPP Technical Specifications, Release 99" as published by the $3^{rd}$ Generation Partnership Project (3GPP) Organization Partners, Valbonne, France. One of ordinary skill in the art will recognize, however, that the principles presented herein are substantially independent of a particular protocol or system.

Figure 1:
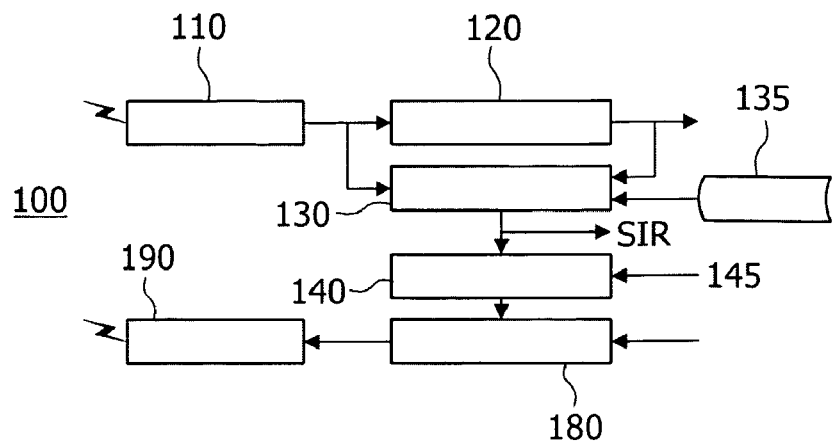
FIG. 1 illustrates an example receiver-transmitter in accordance with this invention.

FIG. 1 illustrates an example transceiver 100 in accordance with this invention. The transceiver 100 includes a receiver 110, commonly termed an "inner receiver" or "equalizer", that is configured to receive a modulated signal from a remote device (not shown) and to provide a demodulated signal to a decoder 120, commonly termed an "outer receiver". The receiver 110 is configured to provide channel equalization, to compensate for undesirable propagation-channel effects, and to mitigate interference effects, so that the performance of the decoder 120 can be optimized. The aforementioned signal-to-interference-ratio, SIR, is a measure of the effectiveness of this channel equalization, and corresponds to the ratio of the signal strength of the desired signal to the signal strength of the interference at the output of the receiver 110.

An SIR estimator 130 is configured to determine an estimate of the SIR from the output of the receiver 110. A primary use of the SIR is to control the power from the remote device to the receiver 110. As such, the output of the SIR estimator 130 is provided to a power feedback controller 140 that compares the estimated SIR to a target SIR 145. The target SIR is typically defined as the minimum SIR required to achieve a given bit-error-rate (BER) at the output of the decoder 120. Based on this comparison, the power feedback controller 140 communicates a message to the remote device, via an encoder 180 and transmitter 190, to effect an increase or decrease of the power output of the remote device for subsequent transmission to this transceiver 100, if required, to achieve the target SIR 145. Optionally, the remote device may communicate similar messages to the transceiver 100, based on an SIR determined at the remote device, to effect a similar control of the power output of the transmitter 190 to achieve a target SIR at the remote device.

Figure 2:
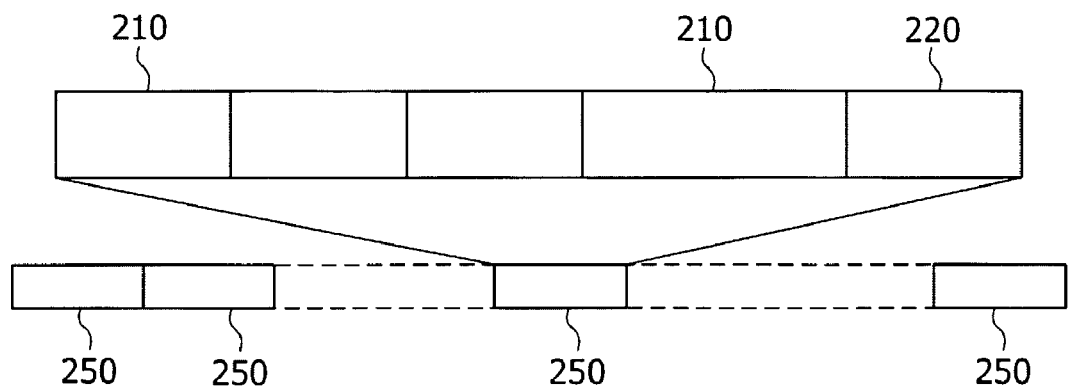
FIG. 2 illustrates an example UMTS compatible transmission stream.

FIG. 2 illustrates an example UMTS compatible transmission stream, as transmitted from a base station to a user's equipment ("node B" and "UE", respectively, in the 3GPP Technical Specifications). The user's equipment UE in a typical embodiment corresponds to a user's mobile phone. FIG. 2 illustrates a frame structure comprised of fifteen slots 250, each slot comprising data bits (Data1 and Data2) 210 and control bits (TPC, TFCI, and Pilot 220). The 3GPP specification provides for dozens of different formats, each format specifying the number of bits allocated to each of the Data1, Data2, TPC, TFCI, and Pilot fields within the slots of the frame. The 3GPP specification also defines the bit-patterns of the Pilot bits within each slot. Thus, each slot contains a predefined number of data bits ($N_{D1}+N_{D2}$), whose values are unknown to the receiver, and a predefined number of pilot bits ($N_{Pilot}$), whose values, being defined in the 3GPP specification, are known to the receiver. In FIG. 1, known pilot symbols at the receiver are illustrated as data set PSym 135.

The SIR estimator 130 is preferably configured to determine at least three estimates of SIR, based upon the receipt of a transmission stream:

a coherent estimate, based on the characteristics of differences between known transmitted signals and received transmitted signals, a non-coherent estimate, based on the characteristics of unknown transmitted signals and received transmitted signal, and a decision-feedback estimate, based on the characteristics of differences between decoded (decided) albeit unknown transmitted signals and the received transmitted signal.

Coherent Estimate: As is well known in the art, the received interference can be more easily/reliably distinguished from the received transmitted signal if the original transmitted signal, such as the pilot signal, is known at the receiver. Effectively, the variance of the difference between the received transmitted signal and the known transmitted signal corresponds to the interference.

Non-coherent Estimate: If the transmitted signal is unknown, such as when data is being received at the receiver, distinguishing between the received transmitted signal and interference is more difficult and/or less reliable, because at least a portion of the variance associated with the received signal will include a variance corresponding to transitions of the transmitted data.

Decision-feedback Estimate: To reduce the effects of the variance corresponding to transition of the transmitted data, the decoded values of the received data from the decoder 120 of FIG. 1 may be fed back to the receiver 110, and used as "assumed-known" transmitted signal values for comparison with stored/delayed values of the received signal to determine the interference present at the received signal that produced this assumed-known value. That is, the variance of the difference between the received transmitted signal and the subsequently determined assumed-known transmitted signal is factored out of the variance of the received signal to determine the variance corresponding to the interference.

One of ordinary skill in the art will recognize that other schemes for estimating SIRs may be employed, depending upon the degree of information that is known a priori, and depending upon the techniques used to distinguish interference from desired signals, as well as other factors. For ease of understanding, the invention is presented in the context of the above three techniques for distinguishing interference and thereby estimating a signal to interference ratio, SIR, for each.

In the general case, a received signal at the output of the receiver 110 of FIG. 1 is defined as:

$$r[n]=a[n]s[n]+v[n] \quad (1)$$

where s[n] represents information signal from the remote device, a[n] represents the amplitude of the information signal after it is communicated from the remote device to the transceiver 100, and v[n] represents the part of the received signal that corresponds to the interference. Generally, the average signal to interference ratio, SIR, can be defined as:

$$\gamma_{avg} = \frac{E\{|\alpha[n]|^2\}}{E\{|v[n]|^2\}}, \quad (2)$$

where E{.} denotes the expectation operator.

Assuming that the noise plus interference is modeled as additive white Gaussian noise (AWGN), the estimate of the SIR at time k can be defined as:

$$\hat{\gamma}(k) = \frac{|\hat{\mu}(k)|^2}{\hat{\sigma}^2(k)}, \quad (3)$$

where $\hat{\mu}(k)$ represents the estimate of the amplitude of the information signal, the square of which represents the estimate of the signal power, and $\hat{\sigma}^2(k)$ represents the estimate of the power of the noise plus interference.

Under the assumption of zero-mean white Gaussian interference-plus-noise, the estimate $\hat{\sigma}^2(k)$ can be expressed, for example, by the maximum likelihood or sample variance estimators, i.e.

$$\hat{\sigma}^2(k) = \frac{1}{N} \sum_{n=k}^{k+N-1} |r[n] - \hat{\mu}(k)|^2 \quad (4)$$

or $$\hat{\sigma}^2(k) = \frac{1}{N-1} \sum_{n=k}^{k+N-1} |r[n] - \hat{\mu}(k)|^2$$

respectively, where N is the number of received symbols used to determine $\hat{\mu}(k)$, which in turn can be expressed, for example, by the sample-mean estimator as detailed below.

If the processed information includes known information signals, s, an estimate of the average amplitude of the information signal can be expressed as:

$$\hat{\mu}_{coh}(k) = \frac{1}{N_{coh}} \sum_{n=k}^{k+N_{coh}-1} \text{Re}\{s^*_{coh}[n]r[n]\} \quad (5)$$

$$= \frac{1}{N_{coh}} \sum_{n=k}^{k+N_{coh}-1} \text{Re}\{s^*_{coh}[n](\alpha[n]s_{coh}[n] + v[n])\},$$

where the superscript "*" denotes complex conjugate, and the "coh" subscript represents the known transmitted signals that provide the coherent estimate $SIR_{coh}$. Under the assumption of zero-mean white Gaussian interference-plus-noise, the estimator above is proven to be the maximum likelihood estimator.

If the processed information includes unknown information symbols, the estimate of the average amplitude of the information signal can be defined as in the particular case of a QPSK symbol constellation:

$$\hat{\mu}_{incoh}(k) = \frac{1}{N_{incoh}} \sum_{n=k}^{k+N_{incoh}-1} \frac{1}{\sqrt{2}} (|\text{Re}\{r[n]\}| + |\text{Im}\{r[n]\}|), \quad (6)$$

where the "incoh" subscript represents the unknown transmitted signals that provide the estimate of the non-coherent estimate $SIR_{incoh}$. A similar approach for any constant modulus symbol constellation, such as for example 8-PSK, leads to $$\hat{\mu}_{incoh}(k) = \frac{1}{N_{incoh}} \sum_{n=k}^{k+N_{incoh}-1} |r[n]| \quad (7)$$

$$= \frac{1}{N_{incoh}} \sum_{n=k}^{k+N_{incoh}-1} \sqrt{\text{Re}\{r[n]\}^2 + \text{Im}\{r[n]\}^2}$$

If the processed information includes "decided", or "predicted, or "decoded", or "assumed-known" information signals, ŝ(n), the estimate of the average amplitude of the information signal can be defined as:

$$\hat{\mu}_{df}(k) = \frac{1}{N_{df}} \sum_{n=k}^{k+N_{df}-1} \text{Re}\{\hat{s}^*[n]r[n]\} \quad (8)$$

$$= \frac{1}{N_{df}} \sum_{n=k}^{k+N_{df}-1} \text{Re}\{\hat{s}^*[n](\alpha[n]s[n] + v[n])\},$$

where the "df" subscript stands for "decision-feedback" and represents the decoded/predicted/decided/assumed-known symbols corresponding to unknown transmitted symbols that provide the decision-feedback estimate $SIR_{df}$. In an embodiment of this invention, the decision feedback mechanism may consist of building the "decided" symbols, ŝ(n), and forming the hard-decision estimates prior the data decoding, as well-known to one of ordinary skill in the art. This approach has the advantage of avoiding the processing delay and the computational complexity involved by the decoding the received data symbols at the expense of a reduced reliability of the decided symbols ŝ(n).

Sampath and Jeske's aforementioned "*Analysis of Signal-to-Interference Ratio Estimation Methods for Wireless Communication Systems*" teaches exponential smoothing of the interference power measure to improve the accuracy of the estimate under the assumption of additive white Gaussian noise (AWGN) in the transmission channel, and static fading conditions, as follows:

$$\tilde{\sigma}^2(k) = \sum_{i=1}^{k} w_i \hat{\sigma}^2(i) \quad (9)$$

where $\hat{\sigma}^2(i)$ denotes the interference-plus-noise power estimate of the form (4) at slot i and $w_1=(1-r)^{k-1}$ and $w_1=(1-r)^{k-1}$ for i=2, 3, ..., k, for each of the coherent, incoherent, and decision-feedback interference power estimates.

Assuming independent channel fading realizations from one to the next slot the SIR estimate is readily given applying the following expression $$\tilde{\gamma}(k) = \frac{|\hat{\mu}(k)|^2}{\tilde{\sigma}^2(k)} \quad (10)$$

where $\hat{\mu}(k)$ and $\tilde{\sigma}^2(k)$ corresponds to each of the coherent, incoherent, and decision-feedback terms defined by equations (5), (7), (8), and (9) above, to provide each of the coherent, incoherent, and decision feedback SIR estimates.

In accordance with this invention, the estimation accuracy of all the three estimators described above can be improved by suitable filtering over successive slots estimate of the signal amplitude and interference-plus-noise power. The sub-scripts "coh," "incoh," and "df" are not explicitly included hereinafter, because the techniques presented apply to each of the three estimators, above.

Figure 3:
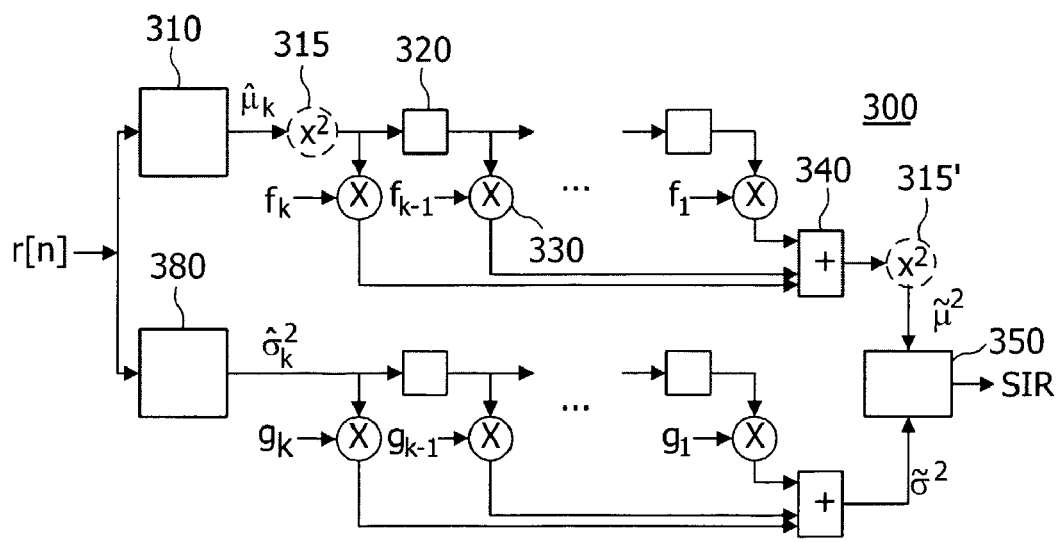
FIG. 3 illustrates an example block diagram of an SIR estimator in accordance with this invention.

FIG. 3 illustrates an SIR estimator 300 that includes filtering elements 320-340 in accordance with this invention. The SIR estimator 300 would typically be replicated for each of the coherent, incoherent, and decision-feedback estimators in a typical receiver. Alternatively, copending EP application 04300186.6, "COMBINING SIGNAL-INTERFERENCE-RATIO (SIR) ESTIMATES FOR IMPROVED SIR ESTIMATION", filed Apr. 8, 2004 for Giuseppe Montalbano, Attorney Docket FR040039 teaches a determination of a composite SIR estimate via a selection of one of these coherent, incoherent, and decision-feedback SIR estimators based on parameters associated with a current communications link, including the format of the communications and prior SIR estimates. When used with this invention, the SIR estimator 300 may be configured with a switching mechanism that couples the filtering elements to the selected estimator, with a corresponding change of filter terms corresponding to the selected estimator.

In the estimator 300, the signal-plus-interference sequence r[n] is provided to conventional SIR estimator components 310, 380 that determine estimates of the signal power based on the average signal-plus-interference signal amplitudes $\hat{\mu}(k)$, and estimates of the interference power based on the variance of the signal-plus-interference signal amplitudes $\hat{\sigma}^2(k)$. In a conventional UMTS-compatible transceiver, the estimates $\hat{\mu}(k)$ and $\hat{\sigma}^2(k)$ are provided for each slot, and are hereinafter termed slot-averaged estimates.

As noted above, the signal power is based on the square of the signal amplitudes. This squaring of the signal amplitude may occur before or after filtering. An optional squaring component 315 is illustrated, corresponding to the choice of filtering of the average signal amplitudes $\hat{\mu}(k)$, or the filtering of the estimated signal power (i.e. the square of the average signal amplitudes), as detailed further below. If the squaring component 315 is not included, then a corresponding squaring component 315' is used at the output of the filter elements; conversely, if the squaring component 315 is included, the squaring component 315' at the output of the filter elements is not included.

In accordance with one aspect of this invention, the estimates of the signal amplitude (i.e. without element 315) are optimally filtered, assuming that the channel statistic is known or estimated. For example, if the Doppler spread due to the velocity of the mobile transmitter or receiver is known or estimated, the receiver can estimate the rate at which the slot-averaged signal amplitude μ(k) and energy vary. In particular, if the noise-plus-interference second order statistic is known or estimated, the k-th slot signal amplitude μ(k) can be estimated by smoothing the previous slot-wise signal amplitude estimates $\hat{\mu}(i)$ for $i=1, \ldots, k$ with an optimal prediction filter with coefficients $f(i)$ such that the signal amplitude estimate is given by:

$$\tilde{\mu}(k) = \sum_{i=1}^{k} f(i)\hat{\mu}(i) \qquad (11)$$

where the filter coefficients $f(i)$ are chosen so as to minimize the mean-square-error of the estimate $E\{|\mu(k)-\tilde{\mu}(k)|^2\}$. The filter $f=[f(k) \ldots f(1)]^T$ defined by the coefficients $f(i)$ is commonly known as linear minimum mean-square error filter, and is given by:

$$f = bR_{\hat{\mu}\hat{\mu}}^{-1} r_{\hat{\mu}\mu(k)} \qquad (12)$$

where:

$R=E\{\hat{\mu}(k)\hat{\mu}(k)^H\}$ denotes the autocorrelation matrix of the vector $\hat{\mu}(k)=[\hat{\mu}(k) \ldots \hat{\mu}(1)]^T$ of the signal amplitude estimates corresponding to slot 1 up to slot k;

$r_{\hat{\mu}\mu(k)}=E\{\hat{\mu}(k)\mu^*(k)\}$ denotes the cross-correlation vector of the true signal amplitude $\mu^*(k)$ averaged over the k-th slot and the vector $\hat{\mu}(k)=[\hat{\mu}(k) \ldots \hat{\mu}(1)]^T$ of the signal amplitude estimates corresponding to slot 1 up to slot k respectively; and b is a real constant that fixes the filter gain; typically b is set such that the filter gain is unity.

Alternatively, by using element 315, and not using element 315', linear minimum-mean square error filtering of the slot average signal power estimate is performed directly in order to minimize the mean square error of the signal power estimates, $E\{(|\mu(k)|^2-|\hat{\mu}(k)|^2)^2\}$. The filter coefficients solving this problem are readily found by replacing the vector $\hat{\mu}(k)=[\hat{\mu}(k) \ldots \hat{\mu}(1)]^T$ by the vector $\hat{E}_s(k)=[|\hat{\mu}(k)|^2 \ldots |\hat{\mu}(1)|^2]^T$, and the quantity to be estimated $\mu(k)$ by $E_s(k)=|\mu(k)|^2$, in equation (14).

In accordance with another aspect of this invention, the aforementioned exponential smoothing based on an assumed AWGN channel model as taught by Sampath et al. is replaced by an optimal linear prediction filter with coefficients $g(i)$, such that:

$$\tilde{\sigma}^2(k) = \sum_{i=1}^{k} g(i)\hat{\sigma}^2(i) \qquad (13)$$

where the coefficients $g(i)$ are chosen so as to minimize the estimate mean-square error $E\{|\sigma^2(k)-\tilde{\sigma}^2(k)|^2\}$. The filter $g=[g(k) \ldots g(1)]^T$ is defined by the coefficients $g(i)$, and as in the signal power filter, above, is given by $$g = dR_{\hat{\sigma}\hat{\sigma}}^{-1} r_{\hat{\sigma}\sigma(k)} \qquad (14)$$

where:

$R=E\{\hat{\sigma}(k)\hat{\sigma}(k)^H\}$ denotes the autocorrelation matrix of the vector $\hat{\sigma}(k)=[\hat{\sigma}(k) \ldots \hat{\sigma}(1)]^T$ of the interference-plus-noise power estimates corresponding to slot 1 up to slot k;

$r_{\hat{\sigma}\sigma(k)}=E\{\hat{\sigma}(k)\sigma^*(k)\}$ denotes the cross-correlation vector of the true interference-plus-noise power estimate $\sigma^*(k)$ averaged over the k-th slot and the vector $\hat{\sigma}(k)=[\hat{\sigma}(k) \ldots \hat{\sigma}(1)]^T$ of the interference-plus-noise power estimates corresponding to slot 1 up to slot k; and d is a real constant that fixes the filter gain; typically d is set such that the filter gain is unity.

A divider element 350 divides the filtered signal power estimate by the filtered interference power estimate to determine the filtered SIR estimate of this invention. As noted above, the above described filtering may be applied to provide a filtered SIR estimate corresponding to each of the coherent, incoherent, and decision-feedback slot-averaged SIR estimates.

In a preferred embodiment of this invention, classical moving average FIR Wiener linear prediction filters are used to embody equations (12) and (14), by considering the observations from slot 0 to slot k−1, instead of from slot 1 to slot k. Other techniques for embodying equations (12) and (14) may also be used. For example, those skilled in the art will recognize that autoregressive IIR Wiener filtering may be used, and that Wiener filtering can be adopted to perform forward, backward, or forward-backward linear prediction, when only past, only future, or both past and future measurements are taken into account in the filtering operation.

The derivation of the optimal filter coefficients $f(i)$ and $g(i)$ can be performed in adaptive fashion, either based on the observation of the signal amplitude estimates $\hat{\mu}(i)$ and the interference-plus-noise power estimates $\hat{\sigma}^2(i)$ for $i=1, \ldots, k$ or based on the estimates of the parameters characterizing the statistics of the signal amplitude and the interference-plus-noise term. Furthermore, the optimal filter coefficients $f(i)$ and $g(i)$ can be estimated based on standard recursive "adaptive" filtering techniques by employing, for example, least-mean-square or recursive least squares adaptive algorithm techniques, well-known by the those skilled in the art, which make effective use of the structure of the matrices and vectors operations expressed by equations (12) and (14) to reduce the computational complexity and to allow a recursive-continuous adaptation/tracking of the optimal filters coefficients (see, for example, S. S. Haykin *Adaptive filter theory*, Englewood-cliffs, NJ: Prentice Hall, 1995, and S. M. Kay, *Fundamentals of statistical signal processing estimation theory*, Englewood-cliffs, NJ: Prentice Hall, 1993). In contrast with a non-recursive adaptive approach, where a fixed number of measurements are used at one time to estimate the filter coefficients, the recursive adaptive techniques improve the accuracy of the filter coefficients estimates as the number of successive measurements/observations increases with the time. Alternatively, the same adaptive techniques can be employed to estimate the parameters that characterize the statistics of the signal amplitude and the interference-plus-noise term, and then compute the optimal filters coefficients in a second step, based on these estimates.

Due to the high complexity involved by the computation of the minimum-mean square error filters, one of ordinary skill in the art will recognize that approximations to the optimal filter characteristics may be employed, based on a more heuristic basis, to simplify the embodiment. In many applications, for example, the interference-plus-noise term is likely to be well approximated by a zero-mean AWGN at least at high spreading factors, and the simple exponential filter expressed by equation (9) may be used. The degradation yielded by that approximation with respect to the optimal filtering can be expected fairly acceptable in most cases. Alternatively, the estimation of the signal amplitude and power using an optimal approach such as given by equation (12) can be expected to yield significant improvement to the overall SIR estimation accuracy, because the signal amplitude and power is strongly dependent on the mobile velocity and the corresponding Doppler spread.

As would be further recognized by one of ordinary skill in the art, sub-optimal filters may be used to approximate the optimal filter expressed by equation (12), to reduce the computational complexity for filtering the signal power estimates. For example, if only the maximum Doppler spread associated with the signal component is estimated, an exponential filter of the form of equation (9) can be suitably configured for the signal amplitude estimation, by adjusting the bandwidth of the smoothing filter bandwidth in order to fit the signal Doppler bandwidth.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts is intended to be required unless specifically indicated.

The invention claimed is:

1. A method of estimating a signal-interference ratio (SIR) comprising:
   determining, by an estimator in a transceiver, an estimate of an average signal power ($\mu^2$);
   determining, by the estimator, an estimate of an average interference power ($\sigma^2$); and
   dividing, by the estimator, the estimate of the average signal power ($\mu^2$) by the estimate of the average interference power ($\sigma^2$) to obtain an estimate of the SIR, wherein at least one of the estimates of the average signal power ($\mu^2$) and the average interference power ($\sigma^2$) is based on a filtered average of a series of sequential estimates ($\hat{\mu}^2(i)$, $\hat{\sigma}^2(i)$) that includes filter terms (f(i), g(i)) applied to each of the series of sequential estimates, and the filter terms (f(i), g(i)) minimize a mean-square error associated with the series of sequential estimates ($\hat{\mu}^2(i)$, $\hat{\sigma}^2(i)$).

2. The method of claim 1, wherein the filter terms (f(i), g(i)) correspond to terms of a moving average Finite Impulse Response (FIR) Wiener linear prediction filter.

3. The method of claim 1, wherein the filter terms (f(i), g(i)) correspond to terms of an autoregressive Infinite Impulse Response (IIR) Wiener filter.

4. The method of claim 1, wherein the estimate of the average interference power ($\sigma^2$) is based on a filtered average of a series of interference power estimates ($\hat{\sigma}^2(i)$), and the interference power estimates ($\hat{\sigma}^2(i)$) correspond to a variance of signal-plus-interference amplitudes (r[n]).

5. The method of claim 1, wherein the estimate of the average signal power ($\mu^2$) is based on a square of a filtered average of a series of signal amplitude estimates ($\hat{\mu}(i)$), and the signal amplitude estimates ($\hat{\mu}(i)$) correspond to averages of signal-plus-interference amplitudes (r[n]).

6. The method of claim 1, wherein the estimate of the average signal power ($\mu^2$) is based on a filtered average of a series of signal power estimates ($\hat{\mu}(i)^2$), and the signal power estimates ($\hat{\mu}(i)^2$) correspond to a square of averages of signal-plus-interference amplitudes (r[n]).

7. The method of claim 1, wherein the estimate of the average signal power ($\mu^2$) is based on the filtered average wherein the filtered terms (f(i)) minimize the mean square error, and further wherein the estimate of the average interference power ($\sigma^2$) is based on an exponential smoothing.

8. The method of claim 1, wherein the filter terms of (f(i), g(i)) correspond to:

$$bR_{\hat{v}\hat{v}}^{-1} r_{\hat{v}v(k)}$$

where:
$R_{\hat{v}\hat{v}=E\{\vec{v}(k)\hat{v}(k)\}}^{H}$ denotes an autocorrelation matrix of a vector $\vec{v}(k) = [\hat{v}(k) \ldots \hat{v}(1)]^T$ of k of the sequential estimates ($\hat{\mu}^2(i)$, $\hat{\sigma}^2(i)$);
$r_{\hat{v}v(k)} = E\{\hat{v}(k)v^*(k)\}$ denotes a cross-correlation vector of a true estimate $v^*(k)$ averaged over the k-th sequential estimates and the vector $\hat{v}(k) = [\hat{v}(k) \ldots \hat{v}(1)]^T$; and
b denotes a real constant that determines a filter gain.

9. The method of claim 1, further comprising:
   estimating, by the estimator, the filter terms (f(i), g(i)) based on recursive adaptive filtering techniques.

10. The method of claim 1, further comprising:
    estimating, by the estimator, parameters that characterize statistics of the sequential estimates ($\hat{\mu}^2(i)$, $\hat{\sigma}^2(i)$) using adaptive filtering techniques, and
    determining, by the estimator, the filter terms (f(i), g(i)) based on these parameters.

11. A transceiver comprising:
    an estimator that receives a signal and estimates a signal-interference ratio (SIR) for the signal, the estimator comprising:
      a first estimator that provides a series of signal amplitude estimates ($\hat{\mu}(i)$);
      a second estimator that provides a series of interference power estimates ($\hat{\sigma}^2(i)$);
      a first filter that provides an estimate of average signal power ($\mu^2$) corresponding to a series of signal amplitude estimates ($\hat{\mu}(i)$), based on filter terms (f(i)) applied to each of the series of signal amplitude estimates ($\hat{\mu}(i)$);
      a second filter that provides an estimate of average interference power ($\sigma^2$) corresponding to a series of interference power estimates ($\hat{\sigma}^2(i)$); and
    a divider that provides a ratio of the average signal power ($\mu^2$) and the average interference power ($\sigma^2$) as an estimate of the SIR, wherein the filter terms (f(i)) minimize a mean-square error associated with the signal amplitude estimates ($\hat{\mu}(i)$).

12. The transceiver of claim 11, wherein the second filter provides the estimate of average interference power ($\sigma^2$) based on filter terms (g(i)) applied to each of the series of interference power estimates ($\hat{\sigma}^2(i)$), and the filter terms (g(i)) minimize a mean-square error associated with the interference power estimates ($\hat{\sigma}^2(i)$).

13. The transceiver of claim 11, wherein the second filter provides the estimate of average interference power ($\sigma^2$), based on an exponential smoothing of the series of interference power estimates ($\hat{\sigma}^2(i)$).

14. The transceiver of claim 11, further comprising:
a squaring component that provides either: a square of an output of the first filter to provide the estimate of average signal power ($\mu^2$), or a square of an input of the first filter to provide a series of signal power estimates ($\hat{\mu}(i)^2$) corresponding to the series of signal amplitude estimates ($\hat{\mu}(i)$).

15. The transceiver of claim 11, wherein the filter terms (f(i), g(i)) correspond to terms of a moving average Finite Impulse Response FIR Wiener linear prediction filter.

16. The transceiver of claim 11, wherein the filter terms (f(i), g(i)) correspond to terms of an autoregressive Infinite Impulse Response (IIR) Wiener filter.

17. The transceiver of claim 11, wherein the first estimator provides the signal amplitude estimates ($\hat{\mu}(i)$) based on an average of input signal-plus-interference amplitudes (r[n]).

18. The transceiver of claim 11, wherein the second estimator provides the interference power estimates ($\hat{\sigma}^2(i)$) based on a variance of input signal-plus-interference amplitudes (r[n]).

19. The transceiver of claim 11, wherein the filter terms (f(i), g(i)) correspond to:

$$bR_{\hat{v}\hat{v}}^{-1} r_{\hat{v}v(k)}$$

where:
$R_{\hat{v}\hat{v} = E\{\hat{v}(k)\hat{v}(k)\}}{}^H$ denotes an autocorrelation matrix of a vector $\hat{v}(k) = [\hat{v}(k) \ldots \hat{v}(1)]^T$ of k of the sequential estimates ($\hat{\mu}^2(i)$, $\hat{\sigma}^2(i)$);

$r_{\hat{v}v(k)} = E\{\hat{v}(k)v^*(k)\}$ denotes a cross-correlation vector of a true estimate v*(k) averaged over the k-th sequential estimates and the vector $\hat{v}(k) = [\hat{v}(k) \ldots \hat{v}(1)]^T$; and b denotes a real constant that determines a filter gain.

20. The transceiver of claim 11, wherein the filter terms (f(i), g(i)) are based on recursive adaptive filtering techniques.

* * * * *